United States Patent [19]

Tongu et al.

[11] Patent Number: 5,282,507
[45] Date of Patent: Feb. 1, 1994

[54] HEAT EXCHANGE SYSTEM

[75] Inventors: Shinji Tongu; Kazumitsu Onoda; Yasumichi Makino; Yoshitaka Matsushima, all of Shizuoka, Japan

[73] Assignee: Yazaki Corporation, Tokyo, Japan

[21] Appl. No.: 911,554

[22] Filed: Jul. 8, 1992

[30] Foreign Application Priority Data

| Jul. 8, 1991 | [JP] | Japan | 3-52559[U] |
| Jul. 10, 1991 | [JP] | Japan | 3-169757 |
| Feb. 10, 1992 | [JP] | Japan | 4-4890[U] |
| Feb. 21, 1992 | [JP] | Japan | 4-7602[U] |
| Jun. 29, 1992 | [JP] | Japan | 4-170920 |

[51] Int. Cl.$^5$ .................. F28F 3/06; F25B 15/00
[52] U.S. Cl. .................. 165/165; 62/476; 62/489; 62/495
[58] Field of Search .......... 165/165; 62/485, 489, 62/493, 486, 513, 495

[56] References Cited

U.S. PATENT DOCUMENTS

| 2,019,351 | 10/1935 | Lathrop | 165/165 |
| 2,685,781 | 8/1954 | Simpson | 62/489 |
| 2,828,946 | 4/1958 | Smith | 165/165 |
| 3,407,625 | 10/1968 | McDonald | 62/476 |
| 3,638,452 | 2/1972 | Kruggel | 62/495 |
| 3,842,820 | 10/1974 | Michels et al. | 165/165 |
| 4,691,528 | 9/1987 | Tongu | 62/495 |
| 4,739,827 | 4/1988 | Onuki | 165/165 |
| 5,105,617 | 4/1992 | Malohn | 165/165 |

FOREIGN PATENT DOCUMENTS

| 2408462 | 8/1975 | Fed. Rep. of Germany | 165/165 |
| 2510245 | 1/1983 | France | 165/165 |
| 118598 | 9/1980 | Japan | 165/165 |
| 857707 | 1/1961 | United Kingdom | 165/165 |

Primary Examiner—John Rivell
Assistant Examiner—L. R. Leo
Attorney, Agent, or Firm—Sughrue, Mion, Zinn, Macpeak & Seas

[57] ABSTRACT

In a heat exchange system such as an absorption refrigerator, a heat exchange element is disposed in at least one of a heat exchanger, a condenser, an evaporator, an absorber and a low-temperature regenerator. The heat exchange element has a bellows-fin formed into a wavelike shape by consecutively bending a thin plate, and sealing plate sealingly attached onto ends of the bellows-fin, for defining adjacent two chambers alternately in the heat exchanger or the like. The heating fluid and the fluid to be heated are heat-exchanged to each other through the thin plate of the bellows-fin defining respective chambers, so that contact area is increased to thereby extremely improve the heat exchange efficiency. Further, the heat exchange element can be manufactured with ease, to thereby decrease the production cost.

30 Claims, 12 Drawing Sheets

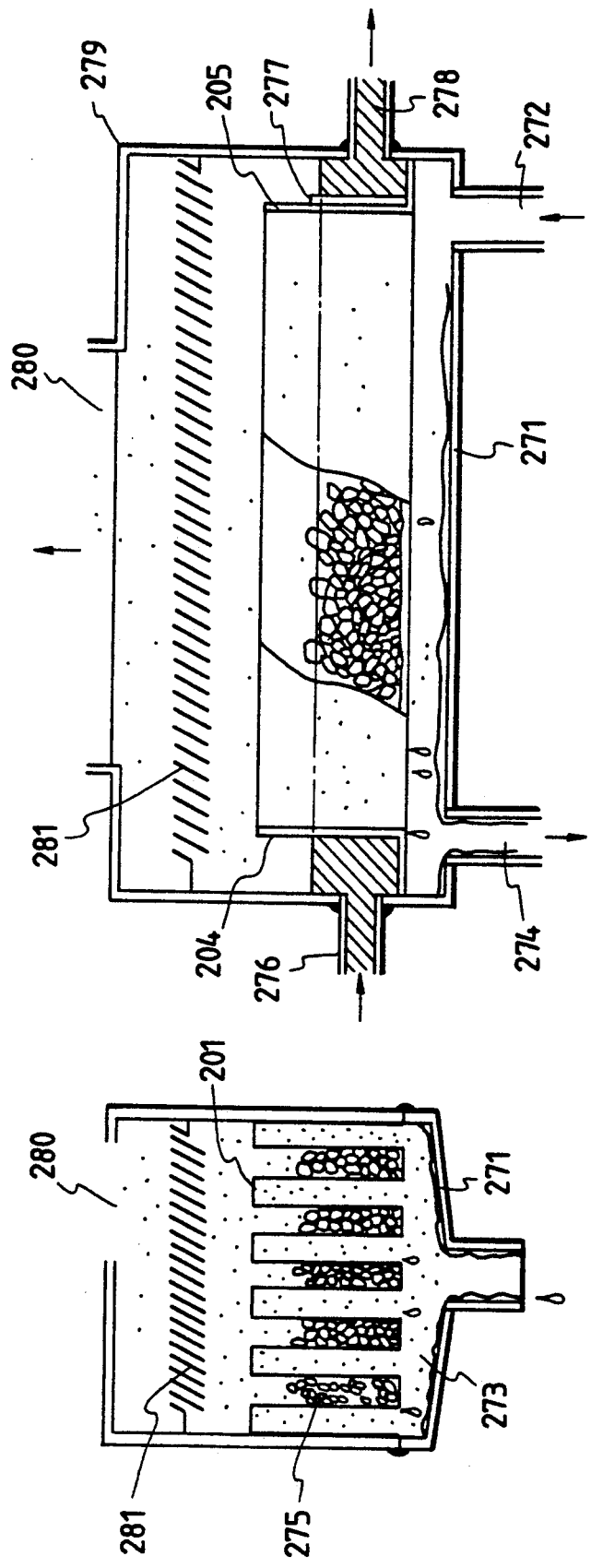

HEAT EXCHANGE SYSTEM

BACKGROUND OF THE INVENTION

The present invention relates to a heat exchange system, and more particularly to a absorption refrigerator whose heat exchange element or device can be manufactured with the cost reduced.

In order to improve the heat exchange efficiency, a conventional heat exchange element or device for a absorption refrigerator is formed with fins 41 shown in FIG. 4 so that the heat-applying fluid such as the concentration solution flows inside the fins 41 whereas the fluid to be heated flows outside the fins 41, both flowing perpendicularly relative to the sheet of FIG. 4. The adjacent fins 41 are connected with each other at their crest portions 44 and bottom portions 45 by TIG welding.

However, in the heat exchange element for the absorption refrigerator, the design of the fins 41 is restricted in view of the manufacturing considerations, so that sufficient heat exchange efficiency cannot be obtained. Further, since the adjacent fins 41 are connected with each other at their crest portions 44 and bottom portions 45 by TIG welding, it is difficult to assemble the fins 41 and the cost is increased for the welding process, so that the entire cost for manufacturing the heat element is unavoidably increased.

SUMMARY OF THE INVENTION

The present invention was made in order to solve the problems in the conventional device.

Accordingly, it is an object of the present invention to provide a heat exchange element or device adapted to be used for a heat exchange system, by which the heat exchange efficiency can be improved and the cost therefor can be decreased with a simple construction and a simple assembling work.

The present invention provides a heat exchange element used in a heat exchange system, which comprises: a bellows-fin formed into a wave-like shape by consecutively bending a thin plate; and sealing plate sealingly attached onto ends of the bellows-fin; whereby defining adjacent two chambers alternately.

The heat exchange element may further comprise a net-like member filled into each-gap between adjacent fins of the bellows-fin in one of the two chambers.

The net-like member may be formed of an expanded metal. The net-like member may have three porous layers such that fluid is hard to flow in outer layers in comparison with an intermediate layer sandwiched between the outer layers. The net-like member may preferably include three layers, outer ones being in the form of textile metallic nets and intermediate ones therebetween being in the form of an expanded metal.

The net-like member may be filled into each gap between adjacent fins of the bellows-fin in both of the two chambers.

The present invention further provides a heat exchange system comprising: a regenerator having a heat source for heating diluted solution; a separator for separating the solution heated in the regenerator into refrigerant in the form of vapor and concentration solution; a solution heat exchanger for performing heat-exchange between the concentration solution supplied from the separator and the diluted solution; a condenser for condensing the refrigerant in the form of vapor supplied from the separator to obtain the refrigerant in the form of liquid; an evaporator for dispersing the refrigerant in the form of liquid supplied from the condenser onto a cooling device to obtain cool water from the cooling device; an absorber for dispersing the concentration solution subjected to the heat-exchange so that the concentration solution absorbs the refrigerant; and a solution circulating pump for supplying diluted solution, which has absorbed the refrigerant in the absorber, through the solution exchanger to the regenerator.

In the present system, at least one of the solution heat exchanger, the condenser, the evaporator and the absorber includes a heat exchange element having a bellows-fin formed into a wave-like shape by consecutively bending a thin plate, and sealing plate sealingly attached onto ends of the bellows-fin, whereby defining adjacent two chambers alternately.

The present invention further provides a heat exchange system, comprising: a high-temperature regenerator having a heat source for heating diluted solution; a separator for separating the solution heated in the high-temperature regenerator into refrigerant in the form of vapor and medium solution; a high-temperature heat exchanger for performing heat-exchange between the medium concentration solution supplied from the separator and the diluted solution; a low-temperature regenerator for heating the medium solution, whose temperature is lowered in the high-temperature heat exchanger, by the refrigerant in the form of vapor supplied from the separator so that refrigerant in the form of vapor is generated from the medium concentration solution to convert the medium solution to concentration solution; a condenser for cooling and liquefying the refrigerant in the form of vapor generated in the low-temperature regenerator; an evaporator for dispersing the refrigerant in the form of liquid supplied from the condenser onto a cooling device to obtain cool water from the cooling device; an absorber for dispersing the concentration solution supplied from the low-temperature regenerator through a low-temperature heat exchanger subjecting the concentration solution to heat-exchange, so that the concentration solution absorbs the refrigerant in the form of vapor evaporated in the evaporator; and a solution circulating pump for supplying diluted solution, which has absorbed the refrigerant in the absorber, through the heat exchanger to the high-temperature regenerator.

In the present system, at least one of the solution heat exchanger, the condenser, the evaporator, the absorber and the low-temperature regenerator includes a heat exchange element having a bellows-fin formed into a wave-like shape by consecutively bending a thin plate, and sealing plate sealingly attached onto ends of the bellows-fin, whereby defining adjacent two chambers alternately.

BRIEF DESCRIPTION OF THE DRAWINGS

In the accompanying drawings:

FIG. 13A shows a low-temperature regenerator in which the heat exchange element as shown in FIG. 8 is provided horizontally, and FIG. 13B is a cross-sectional view thereof.

DETAILED DESCRIPTION OF THE PREFERRED EMBODIMENTS

Figure 3:
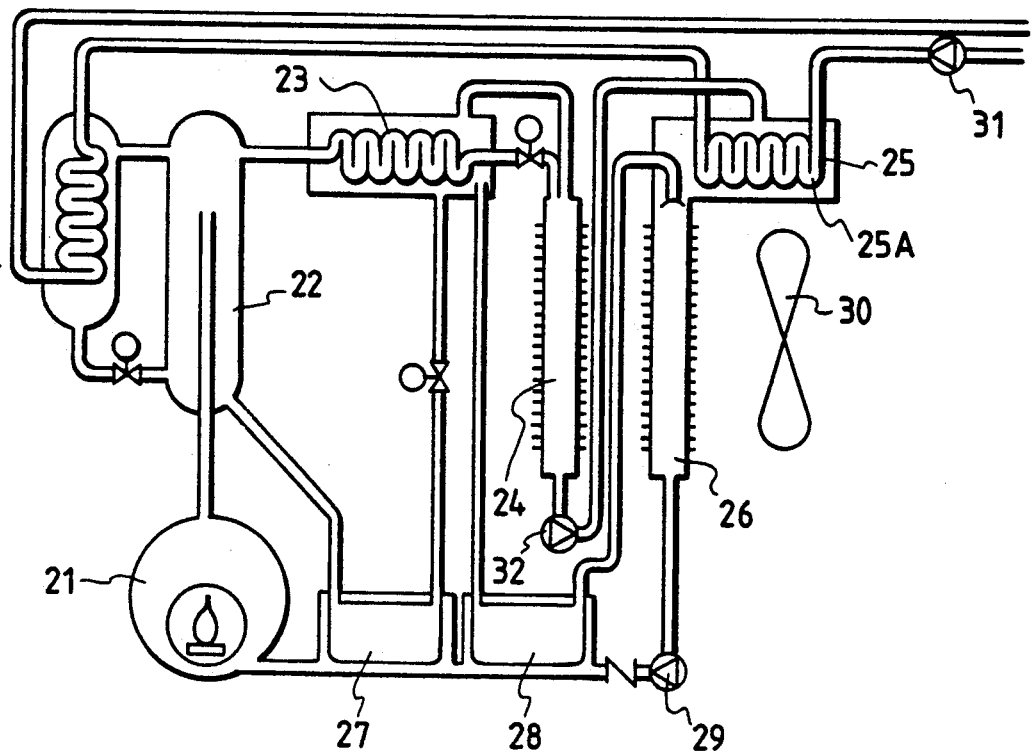
FIG. 3 is a diagram showing a absorption refrigerator as the heat exchange system according to the present invention.

A heat exchange system according to the present invention is described in detail with reference to the drawings attached hereto FIG. 3 shows an absorption refrigerator which is one embodiment of the heat exchange system according to the present invention.

A high-temperature regenerator 21 has a combustion chamber therein, in which the diluted solution whose concentration has become diluted by absorbing the refrigerant is heated so that the refrigerant vapor is generated from the diluted solution and the diluted solution therefore becomes a medium concentration solution. In a separator 22, the medium concentration solution and the refrigerant vapor thus obtained are separated from each other. In a low-temperature regenerator 23, the medium solution whose temperature has been lowered by a high-temperature heat exchanger 27 and the refrigerant vapor supplied from the separator 22 are heated again so that the refrigerant vapor is further generated from the medium concentration solution and the medium concentration solution therefore becomes the concentration solution. Simultaneously, the refrigerant vapor supplied from the separator 22 is partially condensed in the low-temperature regenerator 23 to obtain the refrigerant liquid. In a condenser 24, the refrigerant vapor generated in the low-temperature regenerator 23 and the remaining refrigerant vapor supplied from the low-temperature regenerator 23 are cooled and liquified by means of a fan 30 so that these are converted into the refrigerant liquid. In an evaporator 25, a thermally conductive pipe (water cooler) 25A is disposed so that circulated water to be cooled flows inside the pipe 25A and the refrigerant liquid supplied from the condenser 24 is dispersed onto the pipe 25A, to thereby cool the circulated water by utilizing the heat of the evaporation. The concentration liquid is dispersed in an absorber 26 so as to absorb the refrigerant vapor generated in the evaporator 25. This absorption in the absorber 26 secures the high vacuum effect so that the refrigerant liquid dispersed onto the thermally conductive pipe 25A in the evaporator 25 is immediately evaporated. Two-step (higher side and lower side) heat exchangers are provided in the present system, that is, the heat exchange between the medium concentration solution having the high temperature and the diluted solution having low temperature are performed in the high-temperature heat exchanger 27 whereas the heat exchange between the concentration solution having high temperature and the diluted solution having low temperature is performed in the low-temperature heat exchanger 28, so as to improve the heat-exchange efficiency. A solution circulating pump 29 is provided so as to circulate the diluted solution which has absorbed the refrigerant vapor. The cooling fan 30 is provided so as to cool the absorber 26 and the condenser 24. A cool/heat water pump 31 for circulating the cooled water and a refrigerant circulating pump 32 for supplying the circulated refrigerant liquid into the evaporator 25 are also provided in the present system.

Figure 1:
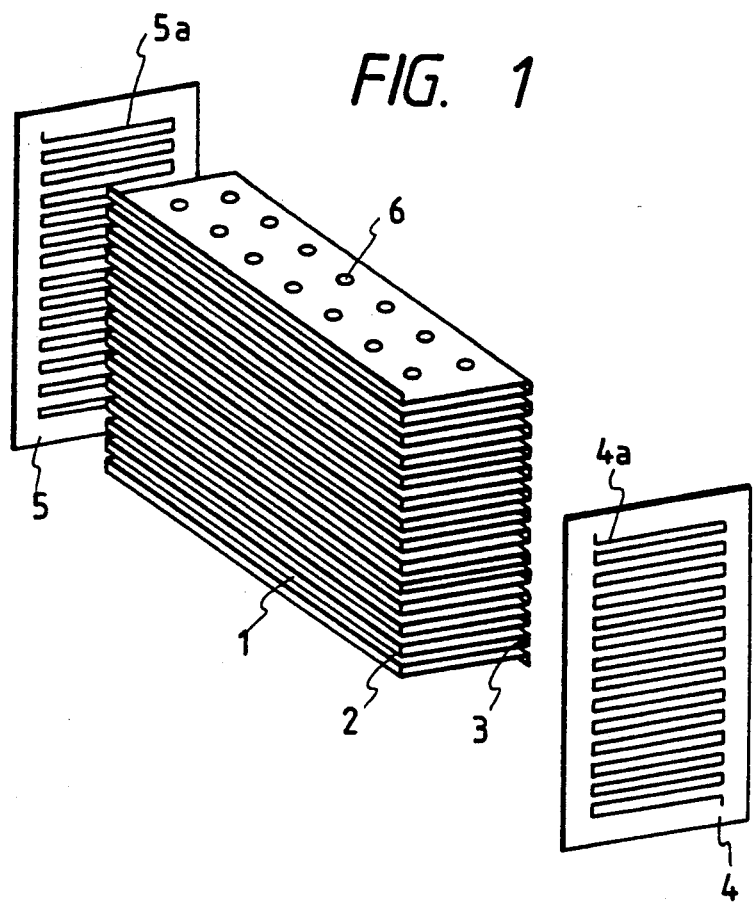
FIG. 1 is a perspective view of a heat exchange element adapted used in a heat exchange system according to an embodiment of the present invention.
Figure 2A:
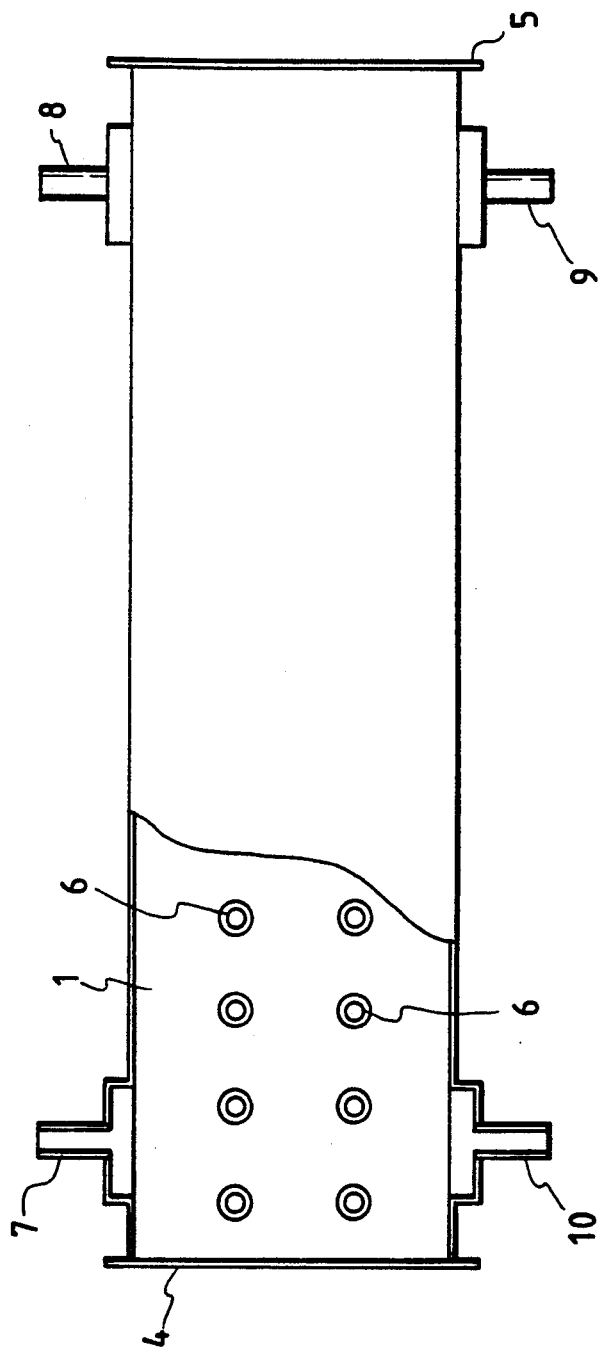
FIG. 2A is a partially broken-away plane view showing a heat exchanger provided with the heat exchange element and FIG. 2B is a cross-sectional side view thereof.
Figure 2B:
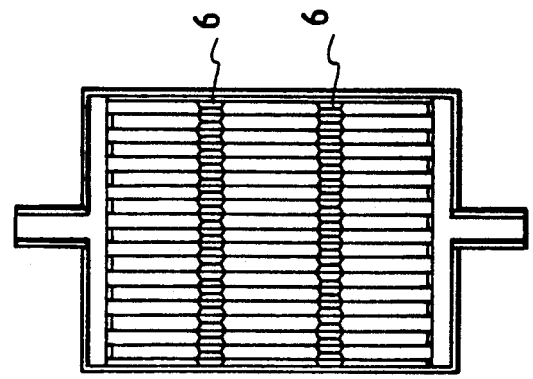
Figure 4:
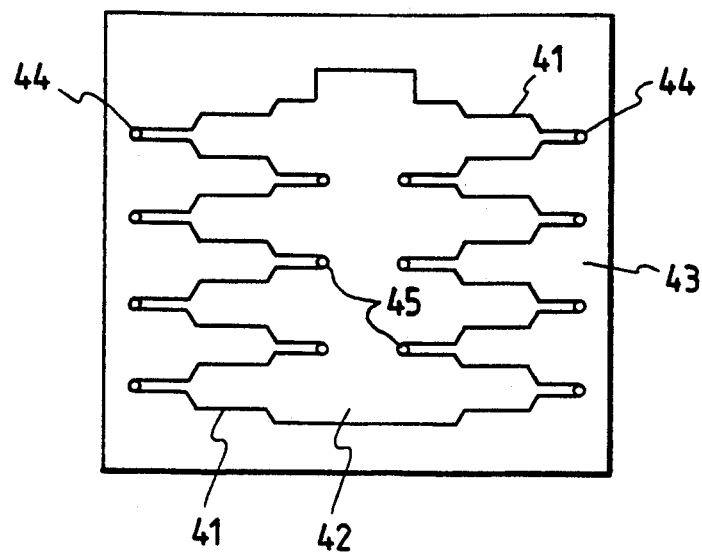
FIG. 4 is a view showing a conventional fin plate.

FIGS. 1 and 2 show a component part used in the high-temperature heat exchanger 27 and/or the low-temperature heat exchanger used in the present system more detail. As shown in FIG. 1, a thin plate having excellent thermal conductivity is bent consecutively into wave-like shape to form a bellows-fin 1 which is similar to one side of a bellows. The bellows-fin 1 in cooperation with sealing plates 4 and 5 sealingly attached onto both ends of the bellows-fin 1, forms an integral container which defines adjacent two chambers alternately. In other words, one chamber is projected toward crest portions 2 of the bellows-fin 1, whereas the other chamber is projected toward bottom portions 3 thereof, thus forming the alternate arrangement of the adjacent chambers along the height of the container in FIG. 1. FIG. 2A and 2B are a partially broken-away plane view of the heat exchanger provided with the above-noted component part and a cross-sectional side view thereof, respectively. As shown, a plurality of ribs are provided on the bellows-fin 1 in a spaced relationship with each other so as to reinforce the bellows-fin 1. The component part, i.e. the container formed by the bellows-fin 1 and the sealing plates 4 and 5 are sealingly housed by the side plates and so on. An inlet 7 for heating fluid is provided on one end portion of one side of the exchanger and an outlet 8 for the heating fluid is provided on other end portion of the side portion. On the contrary, an inlet 9 for fluid to be heated is disposed on one end portion of an opposite side of the heat exchanger and an outlet 10 for the fluid to be heated is provided on the other end portion of the opposite side.

The operation of the heat exchanger thus constructed will now be described. The heating fluid enters through the inlet 7 into one chamber defined by the bellows-fin 1, and flows so as to be discharged through the outlet 8. On the contrary, the fluid to be heated enters through the inlet 9, which is provided to be opposed to the outlet 8, into the other chamber defined by the bellows-fin 1, and then faces the heating fluid through the thin plate of the bellows-fin 1 so that heat-exchange therebetween is performed through the thin plate. The heated fluid subjected to the heat exchange is then discharged through the outlet 10, which is positioned to be opposed to the inlet 7, by means of pump or the like.

Accordingly, since the heating fluid and the fluid to be heated are heat-exchanged to each other through the thin plate of the bellows-fin 1 defining respective chambers, contact area is increased to thereby extremely improve the heat-exchange efficiency.

Further, the bellows-fin 1 can be manufactured in a simple manner since the thin plate is merely bent consecutively. Furthermore, the bellows-fin 1 and the sealing plates are assembled in advance by utilizing grooves 4a and 5a which are formed in the sealing plates 4 and 5, respectively, and which are conformed with respective end portions of the bellows-fin 1, and the thus assembled bellows-fin and sealing plates are placed in a oven to be subjected to brazing process, so that the manufacturing cost can be extremely decreased in comparison with a conventional device manufactured through welding process. Also, the component part comprising the bellows-fin and the sealing plate is reduced in size and weight so that the entire device can be made small in size and weight and the arrangement of the component part can be modified without any space limitation.

In the above-noted component part for the heat exchanger, the ribs are provided for reinforcement purpose. However, since the component part are manufactured through the brazing process in which the assembled bellows-fin 1 and sealing plates 4 and 5 are placed in the oven having high temperature, it is preferable to apply the following arrangement to the component part in stead of the rib arrangement in order to prevent the deformation of the bellows-fin 1 due to the high temperature required for the brazing process. The deformation of the bellows-fin 1 results in a drawback that the gap between the adjacent fins is adversely made un-uniform to cause the un-uniform flow of fluids in the chambers defined by the fins to thereby deteriorate the heat-exchange efficiency.

Figure 5:
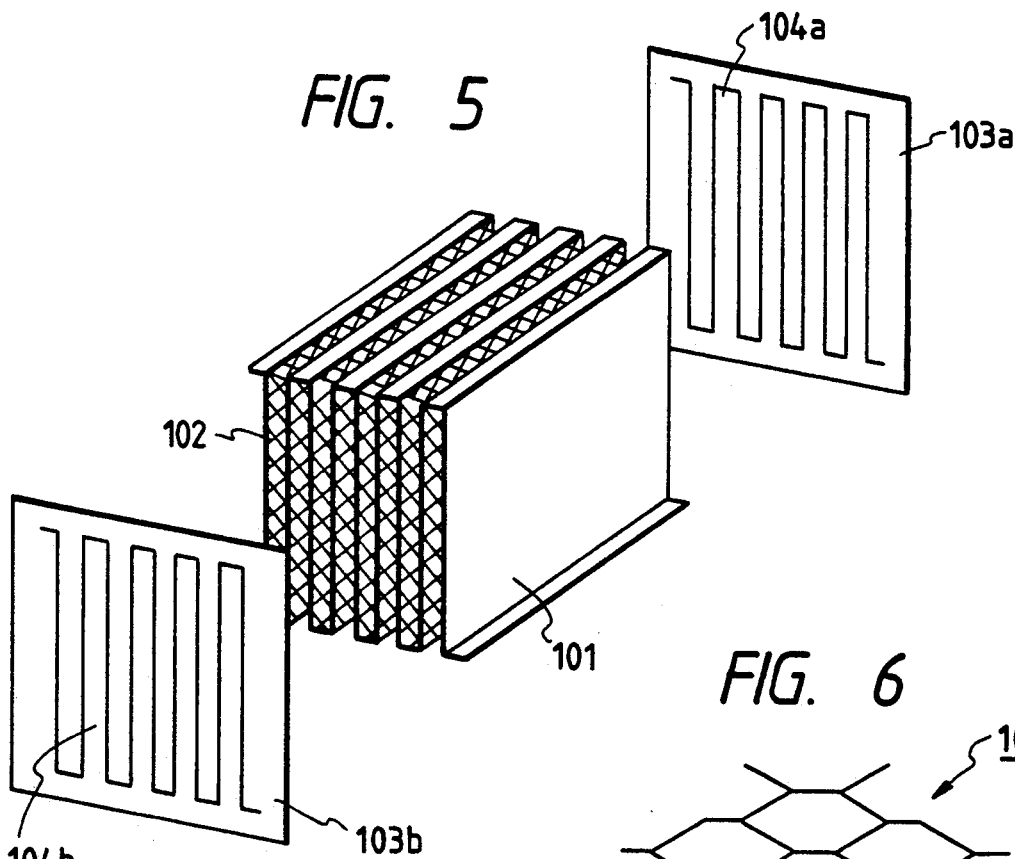
FIG. 5 is an exploded perspective view showing a heat exchange element according to another embodiment of the present invention.

FIG. 5 shows the component part used in the heat exchanger for the absorption refrigerator. The component part comprises a bellows-fin 101 and a plurality of expanded metals 102 each of which is filled into a gap between adjacent two fins of the bellows-fin 101. Seal plates 103a and 103b are connected to ends of the bellows-fin 101 filled with the expanded metal 102.

Figure 6:
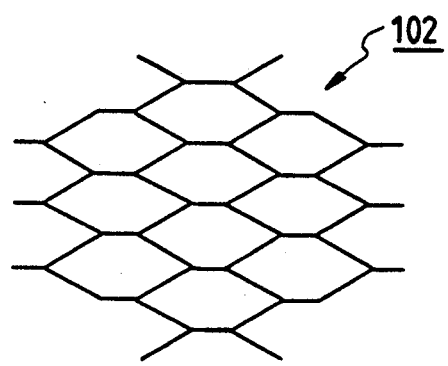
FIG. 6 is a view showing a major part of an expanded metal.

The expanded metal 102 as shown in FIG. 6 is manufactured such that cut slits are formed into a thin plate and the thin plate with the slits are expanded in a predetermined direction. The thus manufactured expanded metal 102 has gaps allowing the flow of the fluid therethrough, and a substantially uniform thickness. Therefore, when the component part is subjected to the high-temperature brazing process in the oven, it is possible to prevent the deformation of the bellows-fin 101 by the expanded metals 102 which are inserted into the respective gaps of the bellows-fin 1 since each gap between the adjacent fins of the bellows-fin 101 can be maintained at an amount corresponding to the thickness of the expanded metal 102.

Further, the expanded metal 102 can also reinforce the bellows-fin 101, so that the ribs can be dispensed with. Accordingly, the materials processing, e.g. the manufacturing of the bellows-fin can be simplified. Due to the provision of the expanded metal 102 between the gap of the bellows fin 1, the turbulent flow effect of the fluid, which effect is conventionally accomplished by applying the herringbone processing to a solution heat exchanger, can be accomplished to thereby improve the heat exchange efficiency.

Instead of the above-noted expanded metal, a mesh-like metal member or other forms can be used as long as the member or the like has a suitable heat resistance that bears against the heat condition for the brazing process in the oven, a suitable solution-resistance that bears against the fluid or solution used in the heat exchanger, and a plate-like form which allows a predetermined fluid flow and has a predetermined thickness.

The above-noted component part, i.e. the bellows-fin or the like has been explained as being used for the low-temperature heat exchanger and/or the high-temperature heat exchanger. However, the component part can also be adapted to be used for the evaporator, the absorber, the condenser, the low-temperature regenerator or the like in the heat exchange system.

Such component part used in the evaporator, the absorber, the condenser, the low-temperature regenerator or the like will now be described in detail along another heat exchange system.

Figure 7:
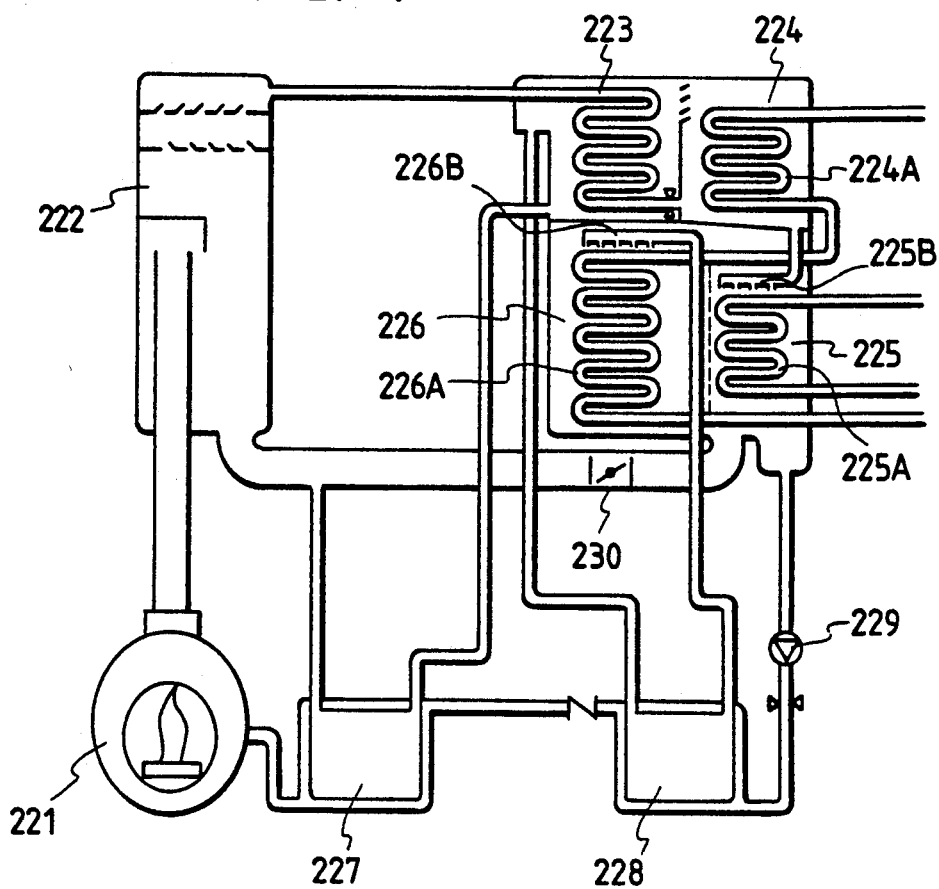
FIG. 7 is a diagram showing another heat exchange system to which the present invention is applicable.

FIG. 7 shows a absorption refrigerator as the heat exchange system in which the component part can be applied to the evaporator, the absorber, the condenser, and/or the low-temperature regenerator thereof. A high-temperature regenerator 221 has a combustion chamber therein, and in which the diluted solution whose concentration has become diluted by absorbing the refrigerant is heated so that the refrigerant vapor is generated from the diluted solution and the diluted solution therefore becomes medium solution. In a separator 222, the medium concentration solution and the refrigerant vapor thus obtained are separated from each other so that the former is supplied to a high-temperature heat exchanger 227 and the latter to a low-temperature regenerator 223. In the low-temperature regenerator 223, -the medium solution whose temperature has been lowered in the high-temperature heat exchanger 227 are heated again by the refrigerant vapor supplied from the separator 222 so that the refrigerant vapor is further generated from the medium concentration solution and the medium solution therefore becomes the concentration solution. The refrigerant vapor generated from the medium concentration solution in the low-temperature regenerator 223 is supplied to a condenser 224. In the low-temperature regenerator 223, simultaneously, the refrigerant vapor supplied from the separator 222 is partially condensed so that the partial refrigerant vapor is converted into the refrigerant liquid, and the refrigerant liquid and the remaining refrigerant vapor is supplied to a condenser 224. In the condenser 224, the refrigerant vapor generated in the low-temperature regenerator 223 and the remaining refrigerant vapor supplied from the low-temperature regenerator 223 are cooled and liquified by cooling water which flows inside the pipe so that these are converted into the refrigerant liquid. The refrigerant liquid thus obtained is supplied to an evaporator 225. In the evaporator 225, a thermally conductive pipe (water cooler) 225A is disposed so that circulated water to be cooled flows inside the pipe 225A and the refrigerant liquid supplied from the condenser 224 is dispersed onto the pipe 225A through a dispersing device 225B, to thereby cool the circulated water by utilizing the heat of the evaporation of the refrigerant liquid. The concentration liquid supplied from the low-temperature regenerator 223 through .a low-temperature heat exchanger 228 is dispersed and dropped in an absorber 226 through a dispersing device 226B so as to absorb the refrigerant vapor generated in the evaporator 225. This absorption in the absorber 226 secures the high vacuum effect in the evaporator 225 so that the refrigerant liquid dispersed onto the thermally conductive pipe 225A in the evaporator 225 is immediately evaporated. In the absorber 226, a cooling means 226A is disposed for cooling process required when the concentration solution, upon absorbing the refrigerant liquid, is converted to the diluted solution. The cooling means 226A is a coil-like pipe which communicates with a cooling means 224A disposed in the condenser 224. The cooling means is designated such that the circulated cooling water flows inside the cooling means. Two-step (higher side and lower side) heat exchangers are provided in the present system, that is, the heat exchange between the medium concentration solution having the high temperature and the diluted solution having low temperature are performed in the high-temperature heat exchanger 227 whereas the heat exchange between the concentration solution having high temperature and the diluted solution having low temperature is performed in the low-temperature heat exchanger 228, so as to improve the heat-exchange efficiency. A solution circulating pump 229 is provided so as to circulate the solution such that the diluted solution which has absorbed the refrigerant vapor in the absorber 226 is supplied through the low temperature heat exchanger-228 and the high-temperature heat exchanger 227 to the high-temperature regenerator 221. Reference numeral 230 designates a cooling/heating shifting valve which is provided in a path connecting the separator 222 to the evaporator 225 and the absorber 226 When the valve 230 is shifted into a heating state, the refrigerant vapor which is generated in the high-temperature regenerator 221, is directly introduced into the evaporator 225 through the separator 222 so that the refrigerant vapor having high temperature is heat-exchanged to the circulated water flowing inside the thermally conductive pipe 225A, to thereby obtain hot water.

Figure 8:
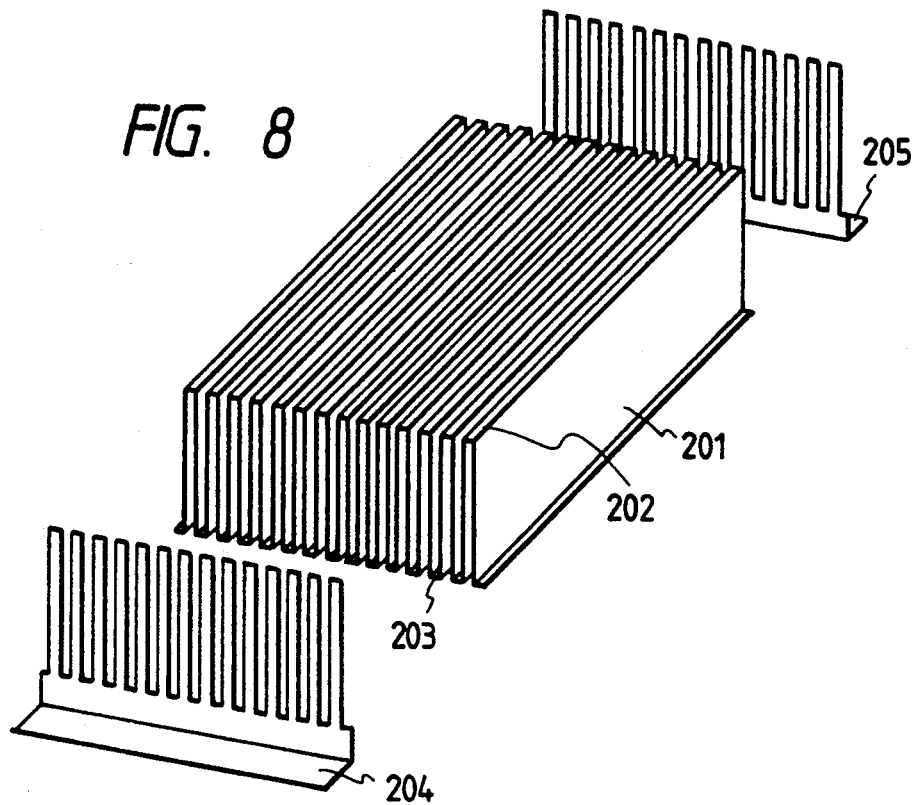
FIG. 8 is an exploded perspective view of a heat exchange element according to yet another embodiment of the present invention.

A component part shown in FIG. 8 can be used for the evaporator 225, the absorber 226, the condenser 224, the low-temperature regenerator 223 or the like. As shown in FIG. 8 which is an exploded perspective view of the component part, a thin plate having excellent thermal conductivity is bent consecutively into wave-like shape to form a bellows-fin 201 which is similar to one side of a bellows. The bellows-fin 201 in cooperation with sealing plates 204 and 205 sealingly attached onto both end of the bellows-fin 201, forms an integral heat exchange element which defines adjacent two chambers alternately. In other words, one chamber is projected toward crest portions 202 of the bellows-fin 201, whereas the other chamber is projected toward bottom portions 203 thereof, thus forming the alternate arrangement of the adjacent chambers horizontally in FIG. 8. Owing to the bellows-fin, the coil-like pipe can be dispensed with from the evaporator, the absorber, the condenser and/or the low-temperature regenerator, so that each device can be made compact in size and light in weight, to thereby increase freedom of layout of each device in the entire system.

Figure 9A:
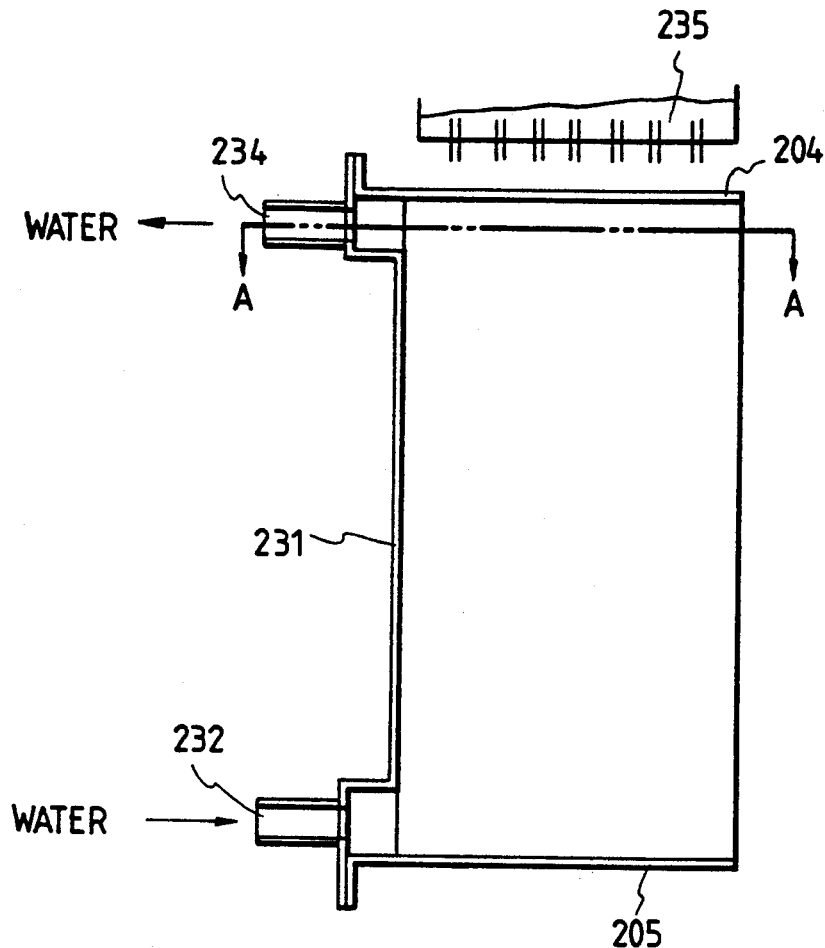
FIG. 9A shows an evaporator in a state where the heat exchange element shown in FIG. 8 is placed vertically.
Figure 9B:
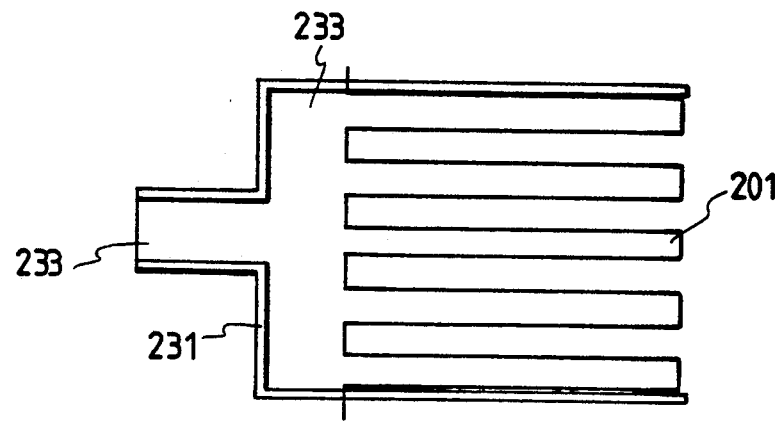
FIG. 9B is a cross-sectional view taken along line A—A in FIG. 9A.

The component part, i.e. the heat exchange element adapted to the evaporator 225 is described in detail with reference to FIGS. 9A and 9B. FIG. 9A show the evaporator 225 in a state that the heat exchange element shown in FIG. 8 is placed vertically, and FIG. 9B is a cross-sectional view taken along line A—A in FIG. 9A. A chamber defined by the side plates 231 and the bellows-fin 201 communicates with a cool water inlet 232 through which the circulated water (cool water) 233 flows into the chamber. Above the inlet 232, provided is a cool water outlet 234 through which the cool water is discharged. On the contrary, the refrigerant liquid 235 supplied from the condenser 224 is dropped onto the other chamber from above as shown FIG. 9A so as to cool the cool water 233 by utilizing the heat of the evaporation when the dropped refrigerant liquid is converted into the refrigerant vapor. In order to improve wetting property, the bellows-fin 201 must have some surface roughness by the sandblasting. The bellows-fin 201 may have the roughness by the knurl of the component rolling.

Figure 9C:
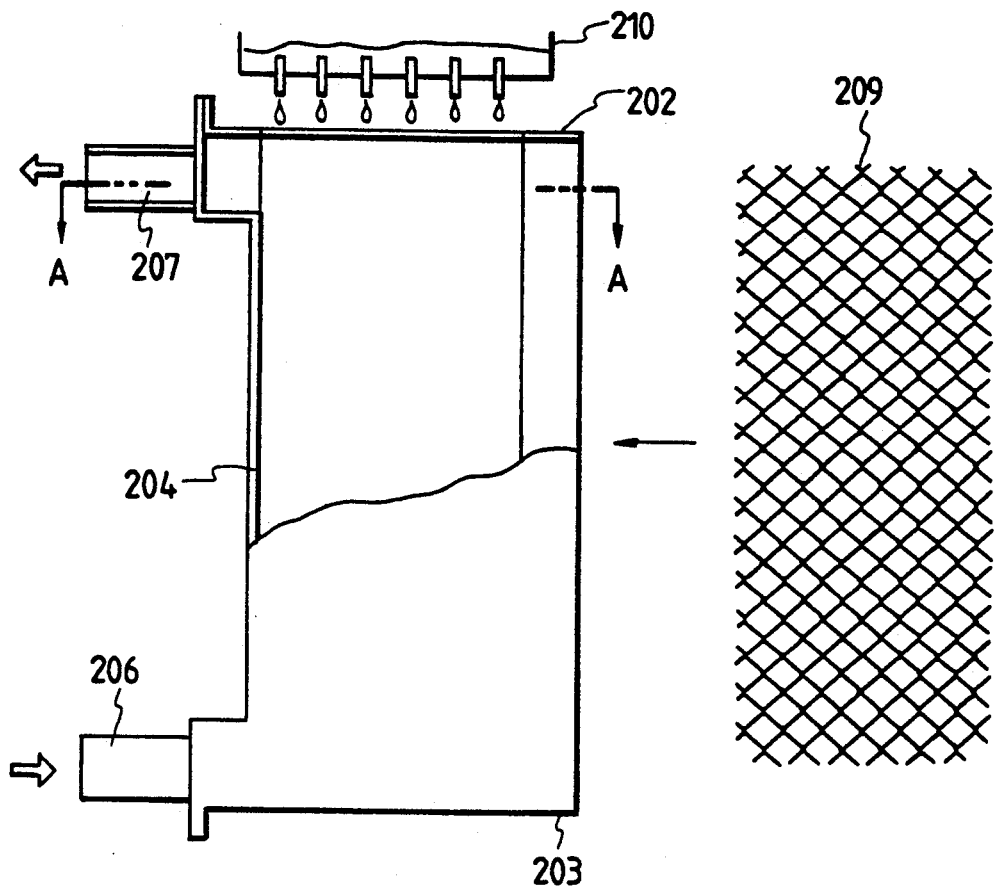
FIG. 9C shows an evaporator in which net-like elements are inserted into one of the chambers defined by the heat exchange element shown in FIG. 8.
Figure 9D:
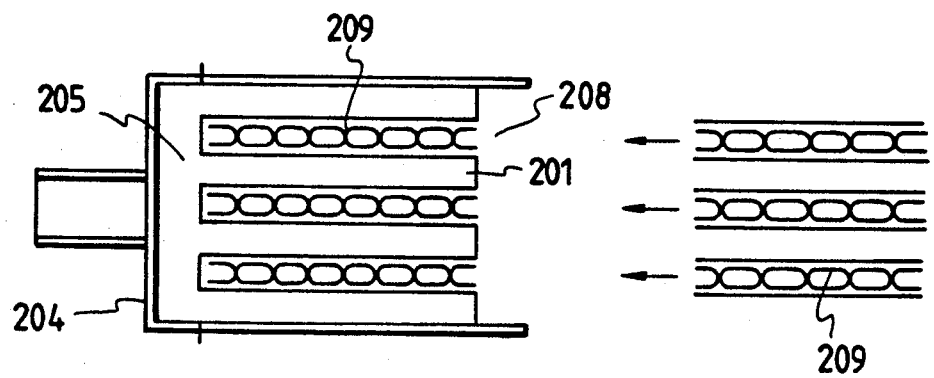
FIG. 9D is a cross-sectional view thereof.

As shown in FIGS. 9C and 9D, net-like members 209 may be inserted into the chamber for the refrigerant liquid in order to improve the wetting property and thermally conductivity.

Figure 9E:
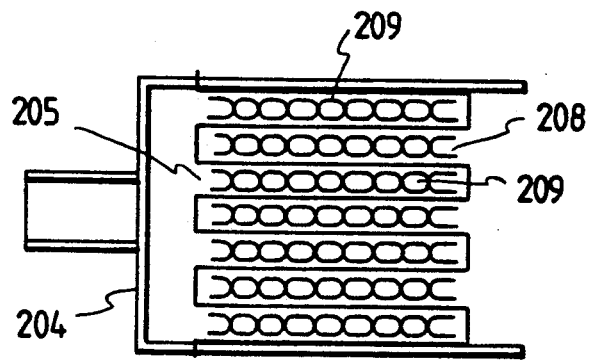
FIG. 9E is a cross-sectional view of an evaporator in which net-like members are inserted into both of the chambers defined by the heat exchange element shown in FIG. 8.
Figure 9F:
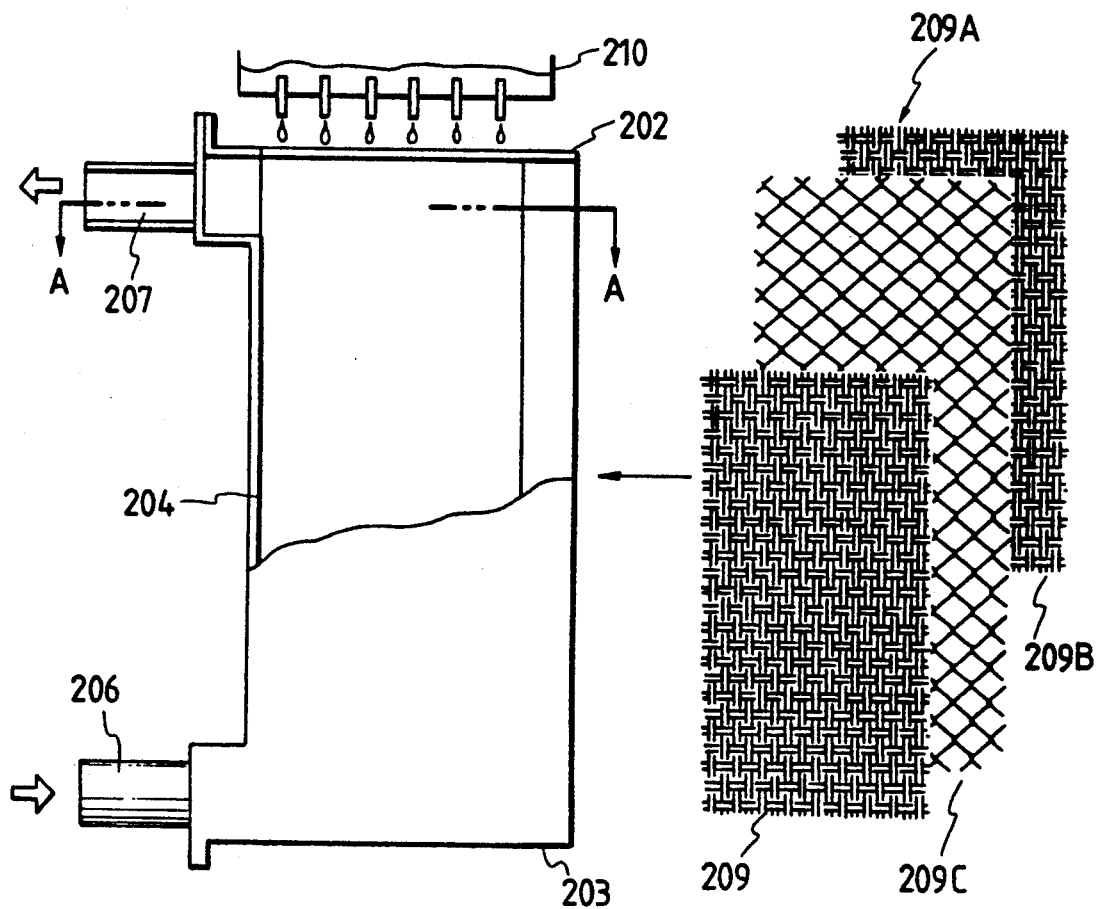
FIG. 9F shows an evaporator in which net-like members each having three porous layers are inserted into one of chambers defined by the heat exchange element shown in FIG. 8.
Figure 9G:
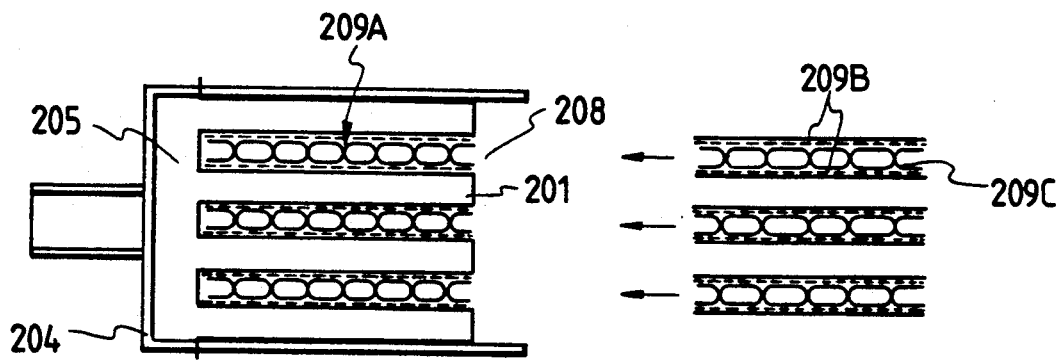
FIG. 9G is a cross-sectional view thereof.

Further, as shown in FIG. 9E, the net-like members may be inserted into both the chambers defined by the bellows-fin in order to prevent the thermal damage caused on the bellows-fin due to the welding process in the oven.

Figure 9H:
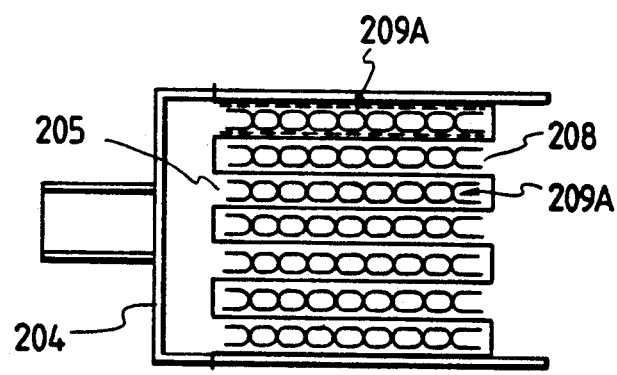
FIG. 9H is a cross-sectional view of an evaporator in which net-like members each having three porous layers are inserted into both of the chambers defined by the heat exchange element.

The net-like member may be the expanded metal noted above, but preferably the net-like member has the following sandwiched arrangement in order to improve both the wetting and liquid discharging properties. As shown in FIG. 9 F, the net-like member 209A with the sandwiched arrangement comprises three porous layers, outer ones being in the form of textile metallic nets 209B and intermediate one between formers being in the form of an expanded metal 209C. The member 209A in which the expanded metal 209C is sandwiched between the textile metallic nets 209B, is inserted into the chamber. The mesh dimension of the expanded metal 209C is larger than the that of the textile metallic net 209B. Accordingly, the member 209A has a characteristic that the refrigerant, solution or the like is hard to flow inside both outer layers thereof in comparison with the intermediate layer. The textile metallic net may be any one of a plain weave metallic net, a twill weave metallic net and a matting weave metallic net, but preferably have dimensions regulated by JIS G 3555. Also, the expanded metal 209C preferably have dimensions regulated by JIS G 3351. It is preferable that the mesh dimension of the expanded metal 209C is set within a range of 12×30.5 mm to 25×60 mm although it depends on the length between the crest and the bottom of the bellows-fin. With respect to the textile metallic net 209B, it is preferable, for example, that the net 209B has the mesh dimensions of 30–50 mm and the wire diameter of 0.35–0.11 mm when the sandwiched member 209 is used for the evaporator 225, and the mesh dimensions of 10–20 mm and the wire diameter 1.2–0.18 mm when the member 209 is used for the absorber 226. The textile metallic net is preferably adhered by brazing onto both surfaces (heat conductive surfaces) of the bellows-fin in the chamber into which the net is inserted, and further preferable that the refrigerant, the solution, or the like flows toward the heat conductive surfaces of the bellows-fin so that the refrigerant, the solution or the like are diffused on those surfaces. When the net-like member with the sandwiched arrangement is inserted into the chamber, since the mesh dimension is small at the outer layer sides, i.e. the textile metallic nets 209B, the supplied refrigerant and/or the solution flows enough slowly to permeate into the textile metallic nets 9B so that the wetting property is improved. On the contrary, since the mesh dimension is large at the intermediate layer side, i.e. the expanded metal 209C, products, particularly a gas such as the refrigerant vapor, generated upon the heat exchange can flow quickly in the expanded metal 209C to be discharged therefrom. Further, the expanded metal 209C produces the turbulent flow effect so that the refrigerant and/or the solution can be agitated, to thereby facilitate the succeeding supply of the refrigerant and/or the solution. Accordingly, by inserting the net-like members with sandwiched arrangement as noted above into the chamber, it is possible to improve the wetting property, to facilitate the fluid supply and to improve the heat efficiency, simultaneously. In addition, as shown in FIG. 9H, the net-like members with the sandwiched arrangement may be inserted into both the chambers to prevent the thermal damage caused on the bellows-fin due to the brazing process in the oven.

Figure 10A:
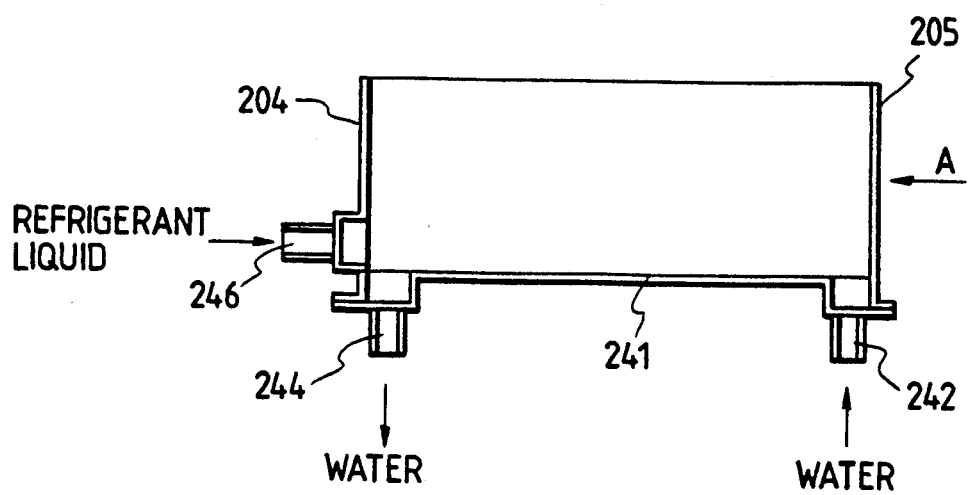
FIG. 10A shows an evaporator in which the heat exchange element shown in FIG. 8 is positioned horizontally.
Figure 10B:
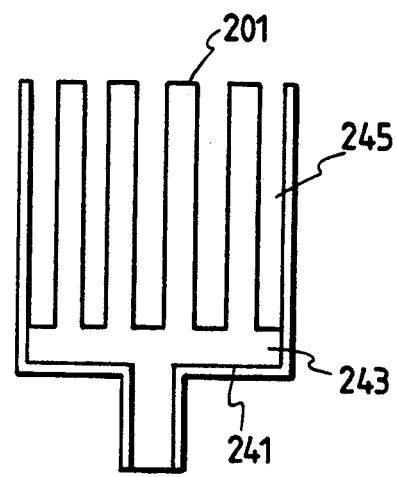
FIG. 10B is a cross-sectional view thereof.

FIG. 10A shows the evaporator 225 in which the heat exchange element shown in FIG. 8 is positioned horizontally. FIG. 10B is a cross-sectional view of the evaporator shown in FIG. 10A. The cool water is circulated such that the cool water 243 flows through an inlet 242 into a chamber defined by the bottom plate 241 and the bellows-fin 201 and is discharged through an outlet 244 provided on the bottom plate 241 at the opposite end portion relative to the inlet 242. On the contrary, the refrigerant liquid supplied from the condenser 224 enters through a refrigerant liquid inlet 246 into the other chamber defined above a passage for the water 243. The entering refrigerant liquid is accumulated in the chamber so that the refrigerant liquid is converted into the refrigerant vapor, at which the cool water is cooled by utilizing the heat of the evaporation. Since it is not necessary for the evaporator shown in FIGS. 10A and 10B to separate and disperse the refrigerant liquid onto the entire surface of the fin, the manner for performing the heat exchange can be simplified in comparison the evaporator shown in FIGS. 9A and 9B. The net-like members may be provided in one of or both of the chambers with a similar manner as shown in FIGS. 9C, 9D, 9E, 9F, 9G and 9H.

Figure 11B:
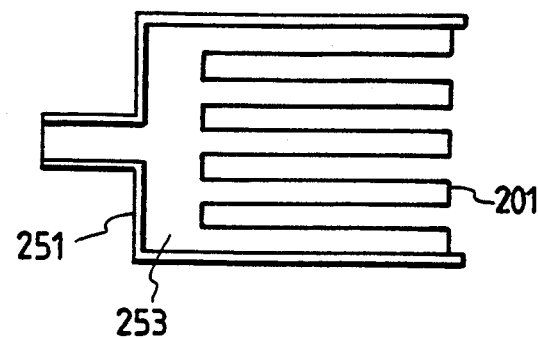
FIG. 11B is a cross-sectional view thereof.
Figure 11C:
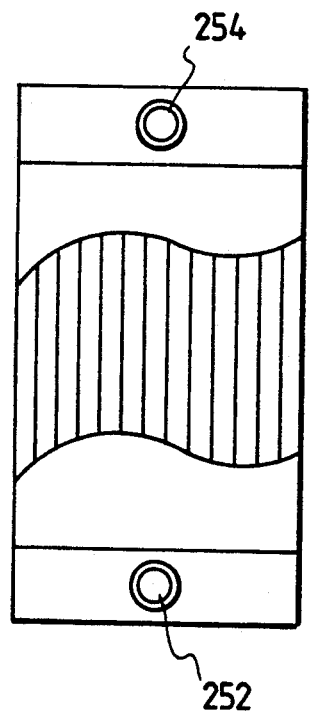
FIG. 11C is a partially broken away view as viewed in a direction indicated by an arrow B.
Figure 11A:
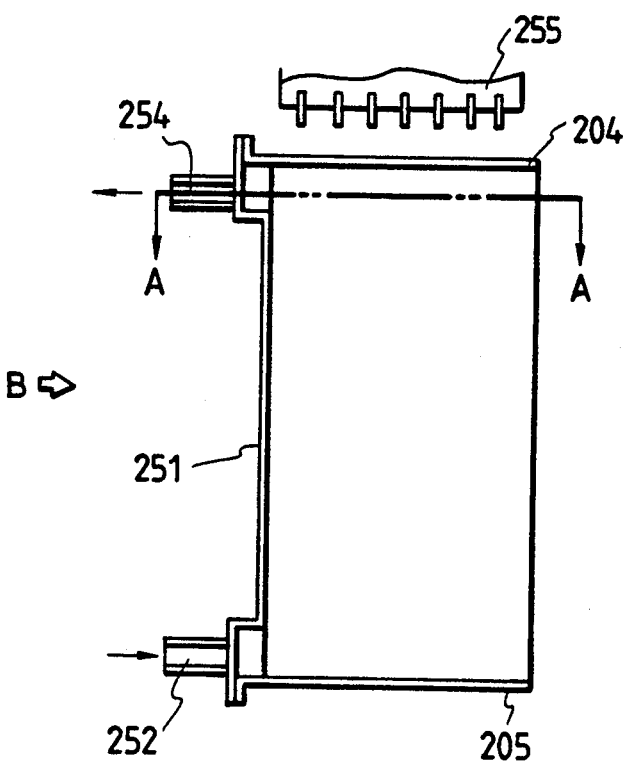
FIG. 11A shows an absorber in which the heat exchange element as shown in FIG. 8 is provided vertically.

FIG. 11A shows the absorber 226 in which the heat exchange element as shown in FIG. 8 is provided vertically. FIG. 11B is a cross-sectional view taken along line A—A in FIG. 11A. FIG. 11C is a partially broken-away view as viewed in a direction indicated by an arrow B. The cool water 253 is introduced through an inlet 252 into a sealed chamber defined by a side plate 251 and the bellows-fin 1 and is discharged therefrom through an outlet 254 disposed above the inlet 252, whereas not only the concentration solution 255 supplied from the low-temperature regenerator 223 through the low-temperature heat exchanger 228 is dropped from above into the other chamber, but also the refrigerant vapor supplied from the evaporator 225 is introduced into the latter chamber. As a result, the concentration solution 253 and the refrigerant vapor is cooled due to the heat exchange performed between the cool water 253 and each of the concentration solution 255 and the refrigerant vapor through the thin plate of the bellows fin 1, so that the concentration solution is converted into the diluted solution by absorbing the refrigerant. The bellows-fin 201 must have some surface roughness by the sandblasting or by the knurl of the component in order to improve wetting property thereof. The net-like members may be provided in one of or both of the chambers with a similar manner as shown in FIGS. 9C, 9D, 9E, 9F, 9G and 9H.

Figure 12B:
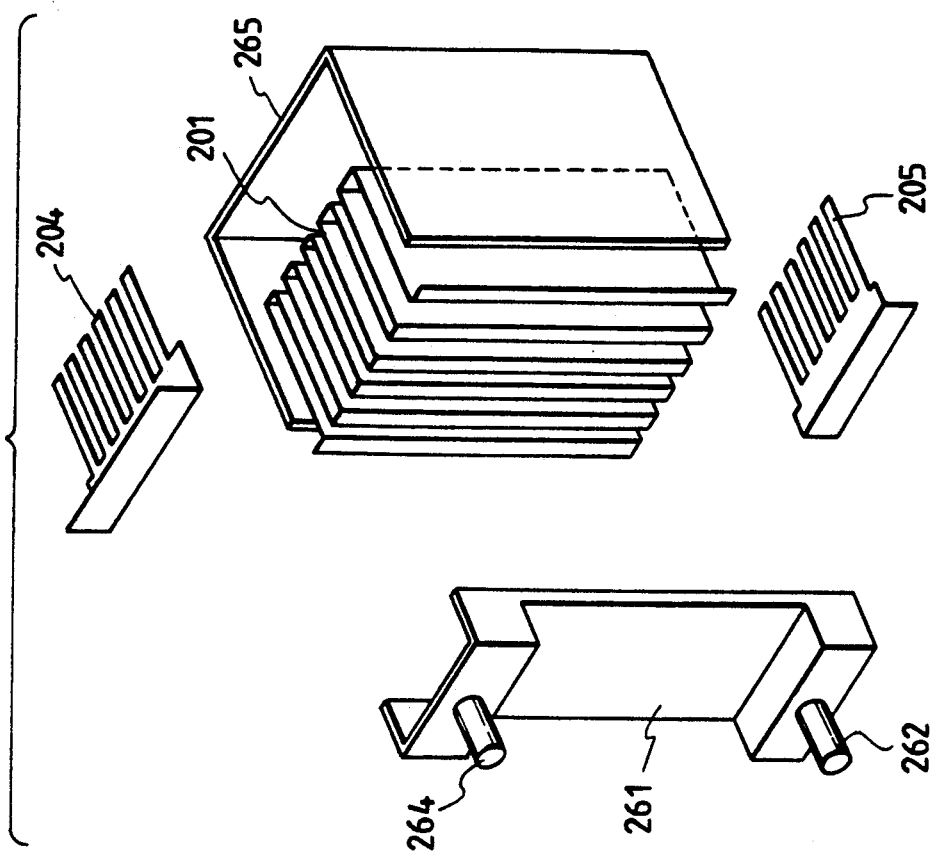
FIG. 12B is a exploded perspective view of the condenser.
Figure 12A:
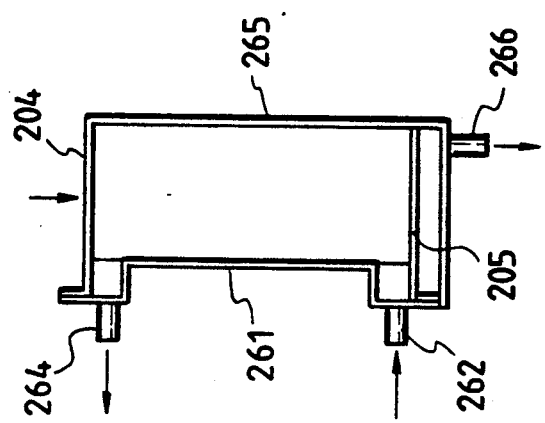
FIG. 12A shows a condenser in which the heat exchange element as shown in FIG. 8 is provided vertically.

FIG. 12A show the condenser 224 in which the heat exchange element shown in FIG. 8 is provided vertically. FIG. 12B is an exploded perspective view of the condenser shown in FIG. 12A. The cool water 263 is introduced through an inlet 262 into a sealed chamber defined by the side plate 261 and the bellows-fin 201 and is discharged therefrom through an outlet 264 disposed above the inlet 262, whereas the refrigerant vapor supplied from the low-temperature regenerator 223 is sealingly introduced from above into the other chamber defined by the side plate 265 and the bellows-fin 201 so as to flow downwardly. As a result, the refrigerant vapor is converted into the refrigerant liquid due to the fact that the refrigerant vapor is heat-exchanged to the cool water 263 through the thin plate of the bellows-fin 201 so as to be cooled, and the refrigerant liquid thus formed is discharged therefrom through an outlet 266 disposed at the bottom the condenser. The net-like members may be provided in one of or both of the chambers with a similar manner as shown in FIGS. 9C, 9D, 9E, 9F, 9G and 9H.

FIG. 13A shows the low-temperature regenerator 223 in which the heat exchange element as shown in FIG. 8 is provided horizontally. FIG. 13B is a cross-sectional view thereof. The refrigerant vapor 273 separated in the separator 222 is introduced through a refrigerant vapor inlet 272 into a sealed chamber defined by the bottom plate 271 of the low-temperature regenerator and the bellows-fin 201, heat-exchanged to the medium solution through the thin plate of the bellows-fin 201 while being passing between fins of the bellows-fin 201, partially converted into the refrigerant liquid, and discharged therefrom through a refrigerant liquid outlet 274. On the contrary, the medium solution 275 separated in the separator 222 and supplied through the high-temperature heat-exchanger 227 is introduced through the medium concentration solution inlet 276 into the other chamber formed by the bellows-fin 1, accumulated in the latter chamber with a constant liquid level held by a liquid level securing weir member 277, and heat-exchanged at a portion of the bellows-fin 201 to the refrigerant vapor 273 so that the refrigerant vapor is generated therefrom by the obtained heat. As a result, the medium concentration solution 275 is converted into the concentration solution which is discharge through the concentration solution outlet 278. The refrigerant vapor generated from the medium concentration solution is discharged through the refrigerant vapor correction opening 280 which is formed on the outer frame 279 of the low-temperature regenerator 223. A drop separating member 281 may be provided on the inside of the outer frame 279 in order to correct the accurate refrigerant vapor. In the heat exchange device of the type in which the medium solution is accumulated for boiling, shallower the liquid level determined by the liquid level securing weir member 271, higher the heat exchange efficiency. In view of this point, it is possible for the present heat exchange device having the bellows-fin to reduce the liquid level as much in comparison with a conventional heat exchange device having coil-like pipe, so that the heat-exchange efficiency can be improved significantly. The net-like members may be provided in one of or both of the chambers with a similar manner as shown in FIGS. 9C, 9D, 9E, 9F, 9G and 9H.

An arrangement in which the heat-exchange element as shown in FIG. 8 is provided vertically may be applicable to the low-temperature regenerator 223. For example, the refrigerant vapor is introduced from above into a closed chamber defined by the bellows-fin and the refrigerant liquid is corrected from a lower portion of the chamber, whereas the medium concentration solution is dropped into the other closed chamber so that the refrigerant vapor is evaporated by boiling and then the concentration solution is corrected from a lower portion of the latter chamber. The net-like members may be provided in one of or both of the chambers with a similar manner as shown in FIGS. 9C, 9D, 9E, 9F, 9G and 9H.

What is claimed is:

1. A heat exchange element used in an absorption refrigerator, comprising:
   a bellows-fin formed into a wave-like shape by consecutively bending a thin plate resulting in opposite open end portions;
   sealing plates respectively sealingly attached to said end portions of said bellows-fin, said bellows-fin and said sealing plates defining adjacent chambers alternately disposed with respect to each other and
   a net-like member provided in each gap between adjacent fins of said bellows-fin in one of said two chambers; wherein said net-like member has three-porous layers adapted to provide different fluid flow rates, the flow rate in outer layers being slower than the flow rate in an intermediate layer sandwiched between said outer layers.

2. The heat exchange element according to claim 1, wherein said net-like member is an expanded metal.

3. The heat exchange element according to claim 1, wherein said net-like member is provided in each gap between adjacent fins of said bellows-fin in both of said two chambers.

4. The heat exchange element according to claim 3, wherein said net-like member is an expanded metal.

5. The heat exchange element according to claim 1, wherein said heat exchange system to which said element is adapted, includes an absorption refrigerator.

6. The heat exchange element of claim 1, wherein said wave-shaped bellows fin is linear.

7. The heat exchange element of claim 6, wherein said linear bellows-fin is disposed vertically in said absorption refrigerator.

8. The heat exchange element of claim 7, wherein a concentration solution is supplied through one of said chambers and cooling fluid is supplied through another one of said chambers such that the concentration solution absorbs refrigerant vapor generated in an evaporator and is converted to a diluted solution.

9. The heat exchange system of claim 7, wherein an inlet to a first of said chambers is provided at a first end of said bellows-fin and an outlet from said first chamber is provided at a second, opposite end of said bellows-fin.

10. The heat exchange element of claim 9, wherein an inlet to a second of said chambers is provide at said second end an outlet from said second chamber is provided at said first end.

11. The heat exchange element of claim 6, wherein said linear bellows-fin is disposed horizontally in said absorption refrigerator.

12. The heat exchange element of claim 11, wherein a concentration solution is supplied through one of said chambers and cooling fluid is supplied through another one of said chambers such that the concentration solution absorbs refrigerant vapor generated in an evaporator and is converted to a diluted solution.

13. The heat exchange system of claim 11, wherein an inlet to a first of said chambers is provided at a first end of said bellows-fin and an outlet from said first chamber is provided at a second, opposite end of said bellows-fin.

14. The heat exchange element of claim 13, wherein an inlet to a second of said chambers is provide at said second end and an outlet from said second chamber is provided at said first end.

15. A heat exchange element used in an absorption refrigerator, comprising:
   a bellows-fin formed into a wave-like shape by consecutively bending a thin plate resulting in opposite open end portions; and
   sealing plates respectively sealingly attached to said end portions of said bellows-fin, said bellows-fin and said sealing plates defining adjacent chambers alternately disposed with respect to each other; and
   a net-like member provided in each gap between adjacent fins of said bellows-fin in one of said two chambers; wherein said net-like member includes three layers, outer ones being in the form of textile metallic nets and intermediate ones therebetween being in the form of an expanded metal.

16. The heat exchange element according to claim 15, wherein said net-like member is provided in each gap between adjacent fins of said bellows-fin in both of said two chambers.

17. A heat exchange system comprising:
   a regenerator having a heat source for heating diluted solution;
   a separator for separating said solution heated in said regenerator into refrigerant in the form of vapor and concentration solution;
   a solution heat exchanger for performing heat-exchange between said concentration solution supplied from said separator and said diluted solution;
   a condenser for condensing said refrigerant in the form of vapor supplied from said separator to obtain said refrigerant in the form of liquid;
   an evaporator for dispersing said refrigerant in the form of liquid supplied from said condenser onto a cooling device to obtain cool water from said cooling device;
   an absorber for dispersing said concentration solution subjected to the heat-exchange so that said concentration solution absorbs said refrigerant;
   a solution circulating pump for supplying diluted solution, which has absorbed said refrigerant in said absorber, through said solution exchanger to said regenerator; and wherein at least one of said solution heat exchanger, said condenser, said evaporator and said absorber includes a heat exchange element having a bellows-fin formed into a wave-like shape by consecutively bending a thin plate resulting in opposite open end portions, and sealing plates respectively sealingly attached to said end portions of said bellows-fin, said bellows-fin and said sealing plates defining adjacent chambers alternately disposed with respect to each other; and a net-like member provided in each gap between adjacent fins of said bellows-fin in one of said two chambers, wherein said net-like member has-three-porous layers adapted to provide different fluid flow rates, the flow rate in outer layers being slower than the flow rate in an intermediate layer sandwiched between said outer layers.

18. The heat exchange system according to claim 17 wherein said net-like member is an expanded metal.

19. The heat exchange system according to claim 17, said net-like member is provided in each gap between adjacent fins of said bellows-fin in both of said two chambers.

20. The heat exchange system according to claim 19, wherein said net-like member is an expanded metal.

21. The heat exchange system according to claim 17, wherein said heat exchange system to which said element is adapted, includes an absorption refrigerator.

22. A heat exchange system, comprising:

a high-temperature regenerator having a heat source for heating diluted solution;

a separator for separating said solution heated in said high-temperature regenerator into refrigerant in the form of vapor and medium concentration solution;

a high-temperature heat exchanger for performing heat-exchange between said medium concentration solution supplied from said separator and said diluted solution;

a low-temperature regenerator for heating said medium concentration solution, whose temperature is lowered in said high-temperature heat exchanger, by said refrigerant in the form of vapor supplied from said separator so that refrigerant in the form of vapor is generated from said medium concentration solution to convert said medium concentration solution to concentration solution;

a condenser for cooling and liquefying said refrigerant in the form of vapor generated in said low-temperature regenerator;

an evaporator for dispersing said refrigerant in the form of liquid supplied form said condenser onto a cooling device to obtain cool water from said cooling device;

an absorber for dispersing said concentration solution supplied from said low-temperature regenerator through a low-temperature heat exchanger subjecting said concentration solution to heat-exchange, so that said concentration solution absorbs said refrigerant in the form of vapor evaporated in said evaporator;

a solution circulating pump for supplying diluted solution, which has absorbed said refrigerant in said absorber, through said heat exchanger to said high-temperature regenerator; and wherein at least one of said solution heat exchanger, said condenser, said evaporator, said absorber and said low-temperature regenerator includes a heat exchange element having a bellows-fin formed into a wave-like shape by consecutively bending a thin plate resulting in opposite open end portions, and sealing plates respectively sealingly attached to said end portions of said bellows-fin, said bellows-fin and said sealing plates defining adjacent chambers alternately disposed with respect to each other; and a net-like member provided in each gap between adjacent fins of said bellows-fin in one of said two chambers, wherein said net-like member has-three-porous layers adapted to provide different fluid flow rates, the flow rate in outer layers being slower than the flow rate in an intermediate layer sandwiched between said outer layers.

23. The heat exchange system according to claim 22, wherein said net-like member is an expanded metal.

24. The heat exchange system according to claim 22, wherein said net-like member is provided each gap between adjacent fins of said bellows-fin in both of said two chambers.

25. The heat exchange system according to claim 24, wherein said net-like member is an expanded metal.

26. The heat exchange system according to claim 22, wherein said heat exchange system to which said element is adapted, includes an absorption refrigerator.

27. A heat exchange system comprising:

a regenerator having a heat source for heating diluted solution;

a separator for separating said solution heated in said regenerator into refrigerant in the form of vapor and concentration solution;

a solution heat exchanger for performing heat-exchange between said concentration solution supplied from said separator and said diluted solution;

a condenser for condensing said refrigerant in the form of vapor supplied from said separator to obtain said refrigerant in the form of liquid;

an evaporator for dispersing said refrigerant in the form of liquid supplied from said condenser onto a cooling device to obtain cool water from said cooling device;

an absorber for dispersing said concentration solution subjected to the heat-exchange so that said concentration solution absorbs said refrigerant;

a solution circulating pump for supplying diluted solution, which has absorbed said refrigerant in said absorber, through said solution exchanger to said regenerator; and wherein at least one of said solution heat exchanger, said condenser, said evaporator and said absorber includes a heat exchange element having a bellows-fin formed into a wave-like shape by consecutively bending a thin plate resulting in opposite open end portions, and sealing plates respectively sealingly attached to said end portions of said bellows-fin, said bellows-fin and said sealing plates defining adjacent chambers alternately disposed with respect to each other; and a net-like member provided in each gap between adjacent fins of said bellows-fin in one of said two chambers, wherein said net-like member includes three layers, outer ones being in the form of textile metallic nets and an intermediate one therebetween being in the form of an expanded metal.

28. The heat exchange element according to claim 27, wherein said net-like member is provided in each gap between adjacent fins of said bellows-fin in both of said two chambers.

29. A heat exchange system, comprising a high-temperature regenerator having a heat source for heating diluted solution;

a separator for separating said solution heated in said high-temperature regenerator into refrigerant in the form of vapor and medium concentration solution;

a high-temperature heat exchanger for performing heat-exchange between said medium concentration solution supplied from said separator and said diluted solution;

a low-temperature regenerator for heating said medium concentration solution, whose temperature is lowered in said high-temperature heat exchanger, by said refrigerant in the form of vapor supplied from said separator so that refrigerant in the form of vapor is generated from said medium concentration solution to convert said medium concentration solution to concentration solution;

a condenser for cooling and liquefying said refrigerant in the form of vapor generated in said low-temperature regenerator;

an evaporator for dispersing said refrigerant in the form of liquid supplied from said condenser onto a cooling device to obtain cool water from said cooling device;

an absorber for dispersing said concentration solution supplied from said low-temperature regenerator through a low-temperature heat exchanger subjecting said concentration solution to heat-exchange, so that said concentration solution absorbs said refrigerant in the form of vapor evaporated in said evaporator;

a solution circulating pump for supplying diluted solution, which has absorbed said refrigerant in said absorber, through said heat exchanger to said high-temperature regenerator; and wherein at least one of said solution heat exchanger, said condenser, said evaporator, said absorber and said low-temperature regenerator includes a heat exchange element having a bellows-fin formed into a wave-like shape by consecutively bending a thin plate resulting in opposite open end portions, and sealing plates respectively sealingly attached to said end portions of said bellows-fin, said bellows-fin and said sealing plates defining adjacent chambers alternately disposed with respect to each other; and a net-like member provided in each gap between adjacent films of said bellows-fin in one of said two chambers, and wherein said net-like member includes three layers, outer ones being in the form of textile metallic nets and an intermediate one therebetween being in the form of an expanded metal.

30. The heat exchange element according to claim 27, wherein said net-like member is provided in each gap between adjacent fins of said bellows-fin in both of said two chambers.

* * * * *